US007957092B2

(12) United States Patent
Ichikawa et al.

(10) Patent No.: US 7,957,092 B2
(45) Date of Patent: Jun. 7, 2011

(54) MAGNETIC DISK DRIVE AND METHOD FOR PRODUCTION THEREOF

(75) Inventors: Kazuhide Ichikawa, Kanagawa (JP); Takashi Kouno, Ibaraki (JP); Akihiko Aoyagi, Kanagawa (JP); Takako Hayakawa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 825 days.

(21) Appl. No.: 12/006,642

(22) Filed: Jan. 4, 2008

(65) Prior Publication Data

US 2008/0165448 A1    Jul. 10, 2008

(30) Foreign Application Priority Data

Jan. 5, 2007    (JP) .................................. 2007-000653

(51) Int. Cl.
*G11B 33/14*    (2006.01)
(52) U.S. Cl. .................................................... 360/97.02
(58) Field of Classification Search .............. 360/97.01, 360/97.02, 97.03, 97.04
See application file for complete search history.

(56) References Cited

U.S. PATENT DOCUMENTS

| 5,999,303 | A  | * | 12/1999 | Drake .......................... 359/224.1 |
| 6,360,035 | B1 | * | 3/2002  | Hurst et al. ....................... 385/18 |
| 6,661,603 | B1 | * | 12/2003 | Watkins et al. ............. 360/97.01 |
| 6,798,729 | B1 | * | 9/2004  | Hurst et al. ...................... 369/119 |
| 7,773,338 | B2 | * | 8/2010  | Hayakawa et al. ......... 360/97.02 |
| 7,872,836 | B2 | * | 1/2011  | Shindo et al. .................. 360/319 |
| 2005/0068666 | A1 |  | 3/2005 | Albrecht et al. |
| 2008/0174910 | A1 | * | 7/2008 | Hirono et al. .............. 360/97.02 |
| 2008/0310048 | A1 | * | 12/2008 | Hirono et al. .............. 360/97.02 |
| 2009/0097163 | A1 | * | 4/2009 | Suzuki et al. .............. 360/245.8 |

* cited by examiner

*Primary Examiner* — Allen T Cao

(57) ABSTRACT

Embodiments of the present invention help to provide a magnetic disk drive in which the base and the lid are securely welded together, so that the low-density gas sealed therein is protected from leakage. According to one embodiment, the peripheral surface of the rib of the base is machined to form the surface, which is free of electrocoating and weld surface. The outer lid, which completely conforms to the contour of the base, is placed on the rib, and the laser beam is directed onto the outer lid. Thus the position of laser beam irradiation varies within only ±0.05 mm for both the base and the lid. Laser welding in this manner yields the bead invariably, which makes the enclosure completely sealed without helium leakage.

12 Claims, 11 Drawing Sheets

MAGNETIC DISK DRIVE AND METHOD FOR PRODUCTION THEREOF

CROSS-REFERENCE TO RELATED APPLICATION

The instant nonprovisional patent application claims priority to Japanese Patent Application No. 2007-000653 filed Jan. 5, 2007 and which is incorporated by reference in its entirety herein for all purposes.

BACKGROUND OF THE INVENTION

Recent magnetic disk drives are designed to drive the disk and head gimbal assembly more rapidly than before to meet requirements for the large capacity, high recording density, and quick access. Such fast driving causes considerable air turbulence, thereby vibrating the disk and head gimbal assembly. The air turbulence is a serious hindrance to the head which seeks densely recorded data on the disk. Air turbulence occurs randomly and pre-diction of its magnitude and period is not easy, and this makes it difficult and complex to control positioning accurately and quickly. Moreover, it causes noise and impedes quiet operation.

Another problem involved in air turbulence that occurs in the rapidly rotating unit is an increased power consumption. A rapidly rotating disk drags air in the vicinity thereof, but air away from the disk remains still. Thus there occurs a shearing force between moving air and still air, which resists the disk rotation. This phenomenon is called windage loss, which is proportional to the rotating speed. High speed rotation against windage loss needs a large electric power.

Knowing that air turbulence and windage loss are proportional to the density of the gas in the sealed magnetic disk drive, there has been proposed an idea of eliminating such troubles by filling the disk drive with a gas having a lower density than air.

Although candidates for the low-density gas include hydrogen and helium, the latter is considered practically effective in view of its stability and safety. In fact, any magnetic disk drive filled with helium gas is free of the above-mentioned problems and is capable of rapid and accurate positioning, power saving, and quiet operation.

Unfortunately, being very small in molecular size and having a very large diffusion coefficient, helium easily leaks during operation from the incompletely sealed enclosure of the ordinary magnetic disk drive.

Thus, there has been proposed in U.S. Patent Publication No. 2005-0068666 ("Patent Document 1") a closed structure capable of sealing an easy-to-leak low-density gas such as helium. FIG. 10A is a sectional view showing the structure of the enclosure of the magnetic disk drive disclosed in Patent Document 1. The enclosure 100 has the base 120 and the lid 110 laser-welded to the top of the side wall thereof, and the enclosure also has the compartment 102 that holds therein the HDD unit 101. The lid 110 is fixed in an environment of helium gas so that helium is enclosed in the compartment 102. After the lid 110 has been fixed, there is obtained the closed magnetic disk drive having the helium-filled enclosure.

The enclosure thus formed is liable to leakage of helium through the top of the side wall of the base 120 and the connecting part 105 of the lid 110. For complete sealing, the lid 110 is laser-welded to the top of the side wall of the base 120.

From the view point of durability, reliability, and cost, the base is formed from aluminum by die casting or from aluminum alloy (with a comparatively low content of copper and magnesium) by cold forging, and the lid is formed from aluminum by pressing or cutting.

FIG. 10B is an enlarged sectional view showing another closed structure of the magnetic disk drive disclosed in Patent Document 1. This closed structure is that of dual-lid structure which has the inner lid 240 and the outer lid 110, which are combined together by the adhesive 214. The closed structure is made airtight by both the inner lid 240, which is held on the flange 221 of the base 120 through the non-airtight seal 242, and the outer lid 110, which is welded to the side wall of the base 120.

For complete sealing, the base and the lid should be made of aluminum and securely joined together by laser welding. To prevent helium leakage, laser welding should be carried out so as to give a compact weld bead free of pores and cracks. To this end, it is necessary to accurately control the relative position of the laser beam and the base and lid. Unfortunately, the base formed from aluminum by die casting lacks the high dimensional precision required for laser welding because the aluminum melt freezes differently in ordinary die casting depending on the amount and temperature of casting.

Moreover, the conventional base tends to cause unsatisfactory welding, which leads to helium leakage, on account of variation in the shape of the lid (and its vicinity) of the side wall of the base. Such variation leads to uneven heat capacity and melting conditions.

Another disadvantage of the die-cast aluminum base is that it has electrocoating for dust suppression which burns at the time of welding and the resulting combustion product adversely affects welding, thereby causing helium leakage.

BRIEF SUMMARY OF THE INVENTION

Embodiments in accordance with the present invention provide a magnetic disk drive in which the base and the lid are securely welded together so that the low-density gas sealed therein is protected from leakage. According to the particular embodiment disclosed in FIG. 1, the peripheral surface of the rib 14 of the base 12 is machined to form the surface 17, which is free of electrocoating and weld surface. The outer lid 20, which completely conforms to the contour of the base 12, is placed on the rib 14, and the laser beam 40 is directed onto the outer lid 20. Thus the position of laser beam irradiation varies within only ±0.05 mm for both the base and the lid. Laser welding in this manner yields the bead 42 invariably, which makes the enclosure completely sealed without helium leakage.

DETAILED DESCRIPTION OF THE INVENTION

Embodiments of the present invention relate to a magnetic disk drive and a method for production thereof, said magnetic disk drive being that of sealed type which is filled with a low-density gas such as helium.

It is an object of embodiments of the present invention to provide a magnetic disk drive in which the base and the lid are securely welded together so that the low-density gas sealed therein is protected from leakage.

In order to achieve the foregoing object, embodiments of the present invention are directed to a magnetic disk drive having a disk, a spindle motor to rotate said disk, a head to record and regenerate information on said disk, and an actuator assembly to move the head in the radial direction of said disk, which are placed in a hermetically sealed space filled with a low-density gas, said space being enclosed by an entirely electrocoated cast base having side walls and a outer lid joined to said side walls, wherein the side walls of the base have their peripheral surface machined to remove the electrocoated surface and the casting surface and said outer lid is joined to the upper surface of the side walls of the base by laser welding.

The outer lid should preferably have the same size as the outer shape of the side walls of the base.

The side walls of the base have flanges on their in-side, said flanges supporting an inner lid attached thereto.

Embodiments of the present invention are directed also to a method for producing a magnetic disk drive, said method comprising a step of preparing an entirely electrocoated cast base having internally flanged side walls, a step of incorporating said base with a disk and a head assembly composed of a spindle motor to rotate said disk, a head to record and regenerate information on said disk, and an actuator assembly to move said head in the radial direction of said disk, a step of attaching a second inner lid to the flange of said base, with a seal inserted between them, thereby forming a closed enclosure, a step of performing machining on the upper peripheral surface of the side walls of said base, thereby removing the electrocoated surface and casting surface, a step of filling said closed enclosure with a low-density gas and inspecting the head disk assembly, and a step of arranging an outer lid on the top of the side walls of the base and then laser-welding said outer lid to the top of the side walls of the base.

Embodiments of the present invention make it possible to prevent the leakage of helium completely owing to the compact uniform welding bead formed after welding between the base and the lid.

Moreover, embodiments of the present invention make it possible to eliminate incomplete welding due to electrocoating because electrocoating is previously removed from the welding part.

The best mode for carrying out embodiments of the invention will be described below with reference to the accompanying drawings.

Figure 2:
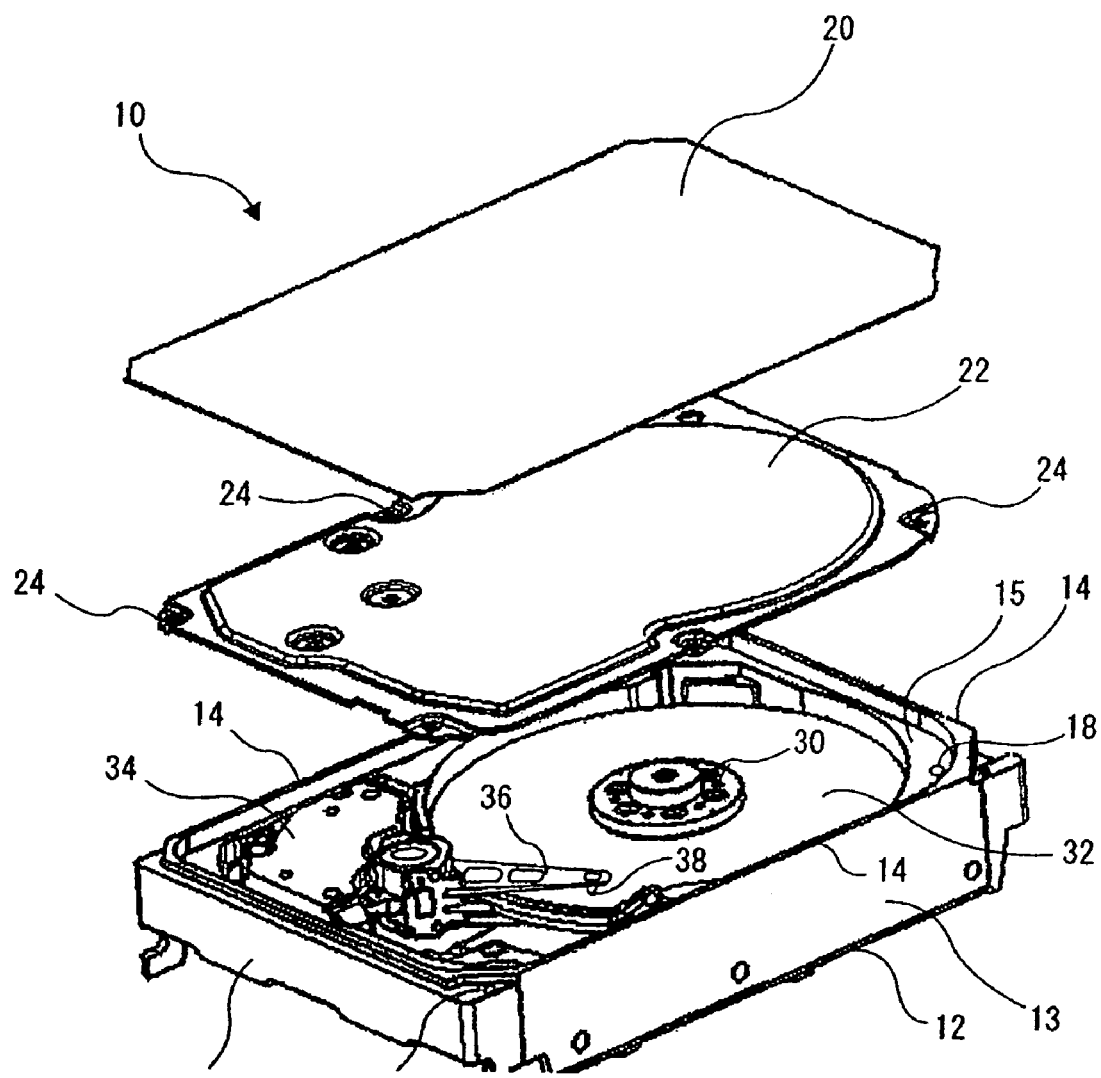
FIG. 2 is an exploded perspective view showing the closed-type magnetic disk drive to which the embodiments of the present invention are applied.

FIG. 2 is an exploded perspective view of the magnetic disk drive according to embodiments of the present invention. The magnetic disk drive 10 is comprised of an enclosure and various components housed therein. The enclosure is constructed of the base 12 (having the surrounding side walls 13), the inner lid 22, and the outer lid 20 in such a way that the inner lid 22 is screwed onto the flange 15 of the side walls 13 of the base 12 and the outer lid 20 is welded to the top (lid) 14 of the side walls 13 of the base 12. In the enclosure there are components for data recording and regeneration. They include the spindle motor 30 fixed to the bottom of the base 12 and the magnetic disk 32 (as an information recording and regenerating medium) which is attached to and driven by the spindle motor 30. On the base 12 is also the actuator assembly 34 (including the voice coil) to drive the head gimbal assembly 36 attached thereto. The head gimbal assembly 36 has at its forward end the magnetic head 38 which writes and reads information to and from the magnetic disk 32. The magnetic head 38 adjoins the slider having the air bearing surface (ABS). The magnetic head 38 performs record writing and reading at a specific position on the truck track of the magnetic disk 32 as the head gimbal assembly 36 moves in the radial direction of the magnetic disk 32.

Another component is the FPC assembly (not shown) which is connected to the magnetic head 38, the motors, and the circuit board (outside the enclosure) to control them, so that it transmits information for writing and reading by the magnetic head 38 and it also transmits electric power to drive the motors. A term "head disk assembly (HDA)" will be used hereinafter that embraces the spindle motor 30, the magnetic disk 32, the actuator assembly 34, and the head gimbal assembly 36.

The enclosure is filled with a low-density gas by attaching the inner lid 22 in an environment of a low-density gas or by attaching the inner lid 22 and then injecting a low-density gas into the enclosure through a hole made in the inner lid 22. The hole is sealed finally. In this way there is obtained the closed enclosure. The low-density gas is helium or hydrogen, with the former being preferable because of its high stability and safety.

For the enclosure to be sealed completely, the outer lid 20 is laser-welded to the rib 14 of the base 12. The material for the base 12 and the outer lid 20 should be properly selected from the standpoint of durability, reliability, and cost. For the best result of laser welding, the base should be made of aluminum by die casting, and the outer lid should be made of aluminum by pressing or cutting. The die-cast aluminum base should be entirely electrocoated to prevent its surface from emitting dust.

Production of the magnetic disk drive includes the assembling process and the inspecting process. In the assembling process, the apparatus HDD is assembled so that it works. In the inspecting process, the HDD is operated to see if it meets the specification and intended performance. If found to be defective, the HDD is returned to the assembling step for replacement of defective parts, with the inner lid removed. For easy removal, the inner lid 22 is fitted to the flange 15 of the base's side walls 13 and then screwed through the through-holes 24 made in the periphery thereof and the tapped holes 18 made in the base 12, before the outer lid 20 is laser-welded. After inspection or repair, the outer lid 20 is laser-welded to make the enclosure completely sealed.

The inner lid 22 is formed from a plate of stainless steel, aluminum, or brass. The peripheral part of the inner lid 22 which comes into contact with the flange 15 has the belt like gasket 28 of elastic material such as fluororubber, so that helium is temporarily sealed. See FIG. 1. This gasket 28 also prevents gas and dust (which occur when the outer lid 20 is laser-welded) from entering the space (within the base 12 and the inner lid 22) which encloses the HDA.

Figure 3:
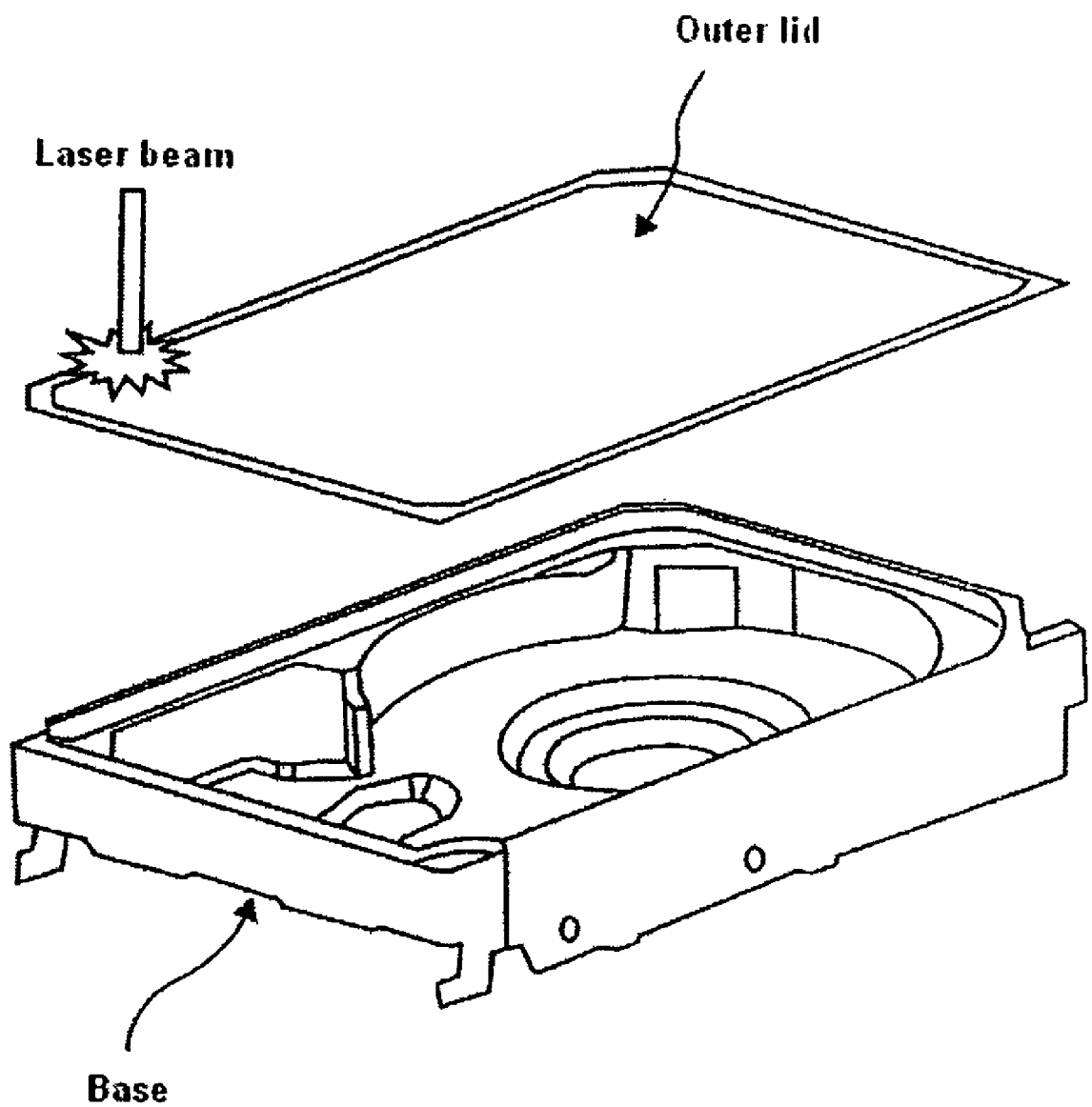
FIG. 3 is a diagram showing how the outer lid is attached to the base by laser welding.
Figure 4A:
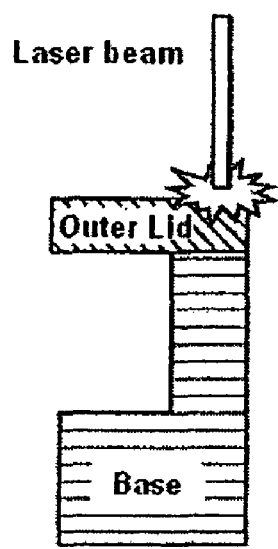
FIGS. 4(a)-4(c) are schematic diagrams showing dislocation of the outer lid relative to the base.
Figure 4B:
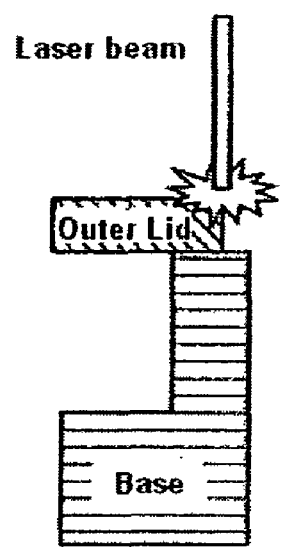
Figure 4C:
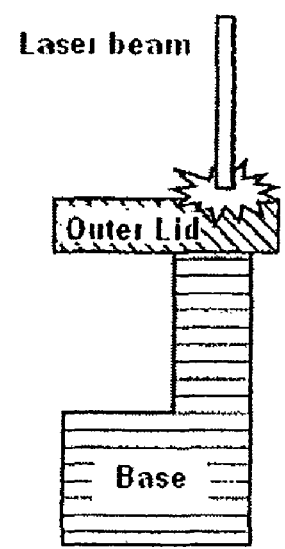
Figure 5:
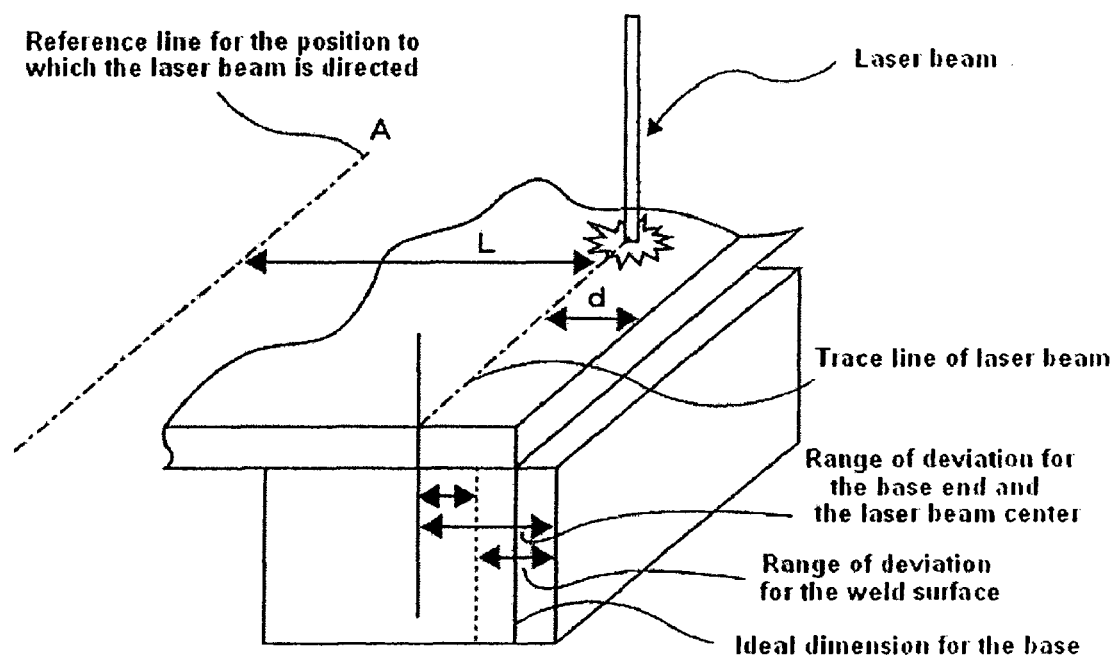
FIG. 5 is a schematic diagram showing the cause of dislocation of the outer lid relative to the base.

The process for laser welding will be outlined below with reference to FIGS. 3 to 5. FIG. 3 shows the position to which the leaser beam is directed when the outer lid is laser-welded to the base, with the HDA omitted. Laser welding is accomplished by allowing the laser beam to trace the entire periphery of the outer lid placed on the base. For satisfactory laser welding, the outer lid should be accurately positioned relative to the base. Large misalignment (up to about 0.1 mm) leads to incomplete laser-welding which allows the leakage of helium enclosed inside. FIG. 4 shows the relative positioning of the base and the outer lid. FIG. 4(a) shows the accurate positioning, and FIGS. 4(b) and 4(c) show the inaccurate positioning, with the outer lid displaced.

The reason for misalignment of the outer lid with the base will be explained below with reference to FIG. 5. The base formed from aluminum by die casting fluctuates (about +/−0.2 mm) in dimensions at its end surface depending on the amount and temperature of casting which affects freezing. Since the laser beam is directed to a position which is a certain distance (L) away from the reference line (A) on the base, variation occurs in the distance (d) between the base end and the center of the laser beam as the position of the base end varies. Variation in the distance (d) results in incomplete poor welding due to varied melting conditions.

Figure 6:
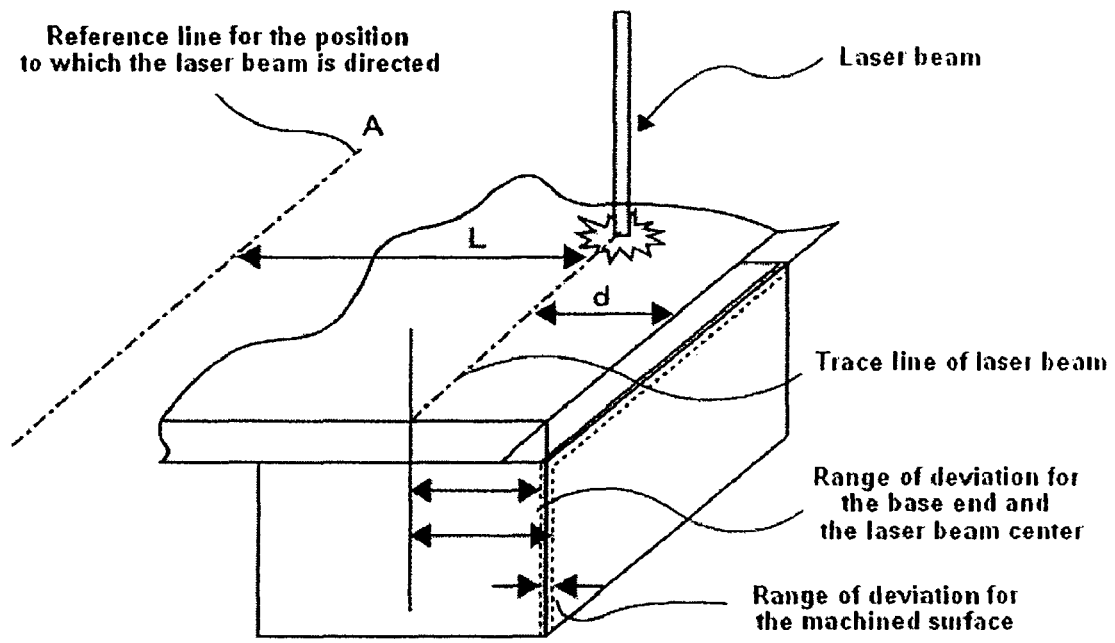
FIG. 6 is a schematic diagram showing a concept of embodiments of the present invention.

FIG. 6 illustrates how to reduce variation in the distance (d) between the base end and the laser beam center, thereby improving welding quality. According to embodiments of the present invention, laser welding is preceded by removal of electrocoated surface and casting surface in the vicinity of welding. This step is accomplished by machining the external lateral sides of the base so that the machined base has the same dimensions as the outer lid. In this way it is possible to reduce variation in the distance (d) between the base end and the laser beam center and also to reduce the dislocation of the outer lid relative to the base.

Figure 1:
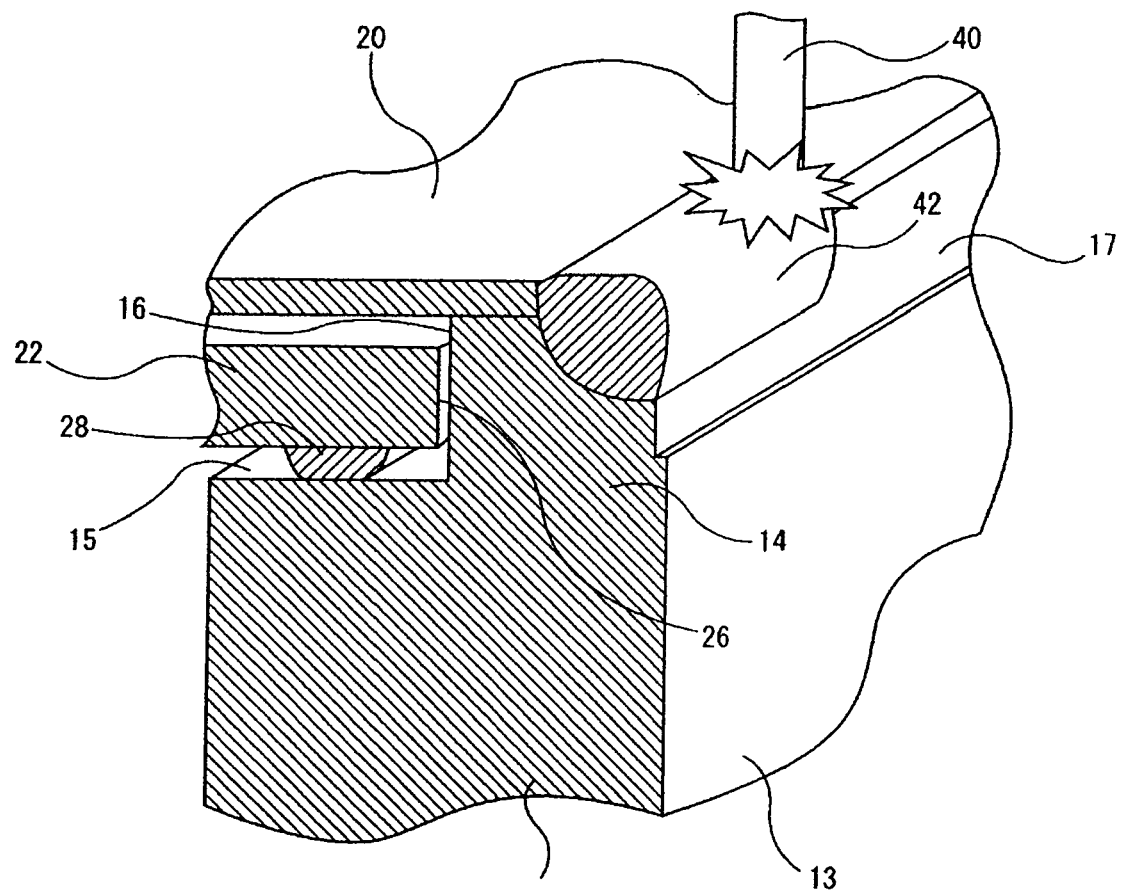
FIG. 1 is a sectional view showing the joining parts of the base, the inner lid, and the outer lid in accordance with embodiments of the present invention.

The example of the present invention will be described with reference to FIG. 1. FIG. 1 is a sectional view showing the base 12, the inner lid 22, and the outer lid 20, which are joined together. It illustrates how the outer lid 20 is laser-welded to the base 12. That part of the base 12 which comes into contact with the outer lid 20 takes on a rib-like shape. The inner lid 22 fits into its position as its edge 26 comes into contact with the inner surface 16 of the rib 14. The inner lid 22 is attached to the flange 15, with the gasket 28 interposed between them. The outer lateral side of the rib 14 (or the surface 17 which is close to the part in contact with the outer lid 20) undergoes machining, so that it is made free of electrocoating and casting surface. Laser welding is accomplished by directing the laser beam 40 to the part at which the outer lid 20 comes into contact with the rib 14. After laser welding, the weld bead 42 is left at the corner.

In order to form the weld bead 42 invariably, it is necessary to accurately direct the laser beam 40 to the desired position on the rib 14 from its lateral outside. If the laser beam 40 has a spot diameter of 0.6 mm, the position of the laser beam (or the center of the laser spot) should be 0.35 mm from the outer lateral side of the rib 14. Deviation from this distance should be within +/−0.05 mm over the entire periphery. Laser beam irradiation at wrong positions causes uneven melting due to variation in the amount of melt and laser energy. This results in defective welding and helium leakage.

Since laser welding in this example is accomplished by machining the peripheral surface of the rib 14 of the base 12, thereby forming the surface 17, then placing the outer lid 20, which completely conforms to the contour of the base 12, on the rib 14, and finally directing the laser beam 40 onto the outer lid 20, the position of laser beam irradiation varies within only ±0.05 mm for both the base and the lid. Laser welding in this manner yields the bead 42 invariably, which makes the enclosure completely sealed without helium leakage. Moreover, machining to make the surface 17 removes electrocoating, thereby eliminating defective welding due to harmful gases that occur when electrocoating (resin) burns upon laser beam irradiation.

The example mentioned above may be modified such that machining is performed on the entire lateral surface of the base 12 in place of the outer surface near that part of the base 12 which comes into contact with the outer lid 20.

Figure 7:
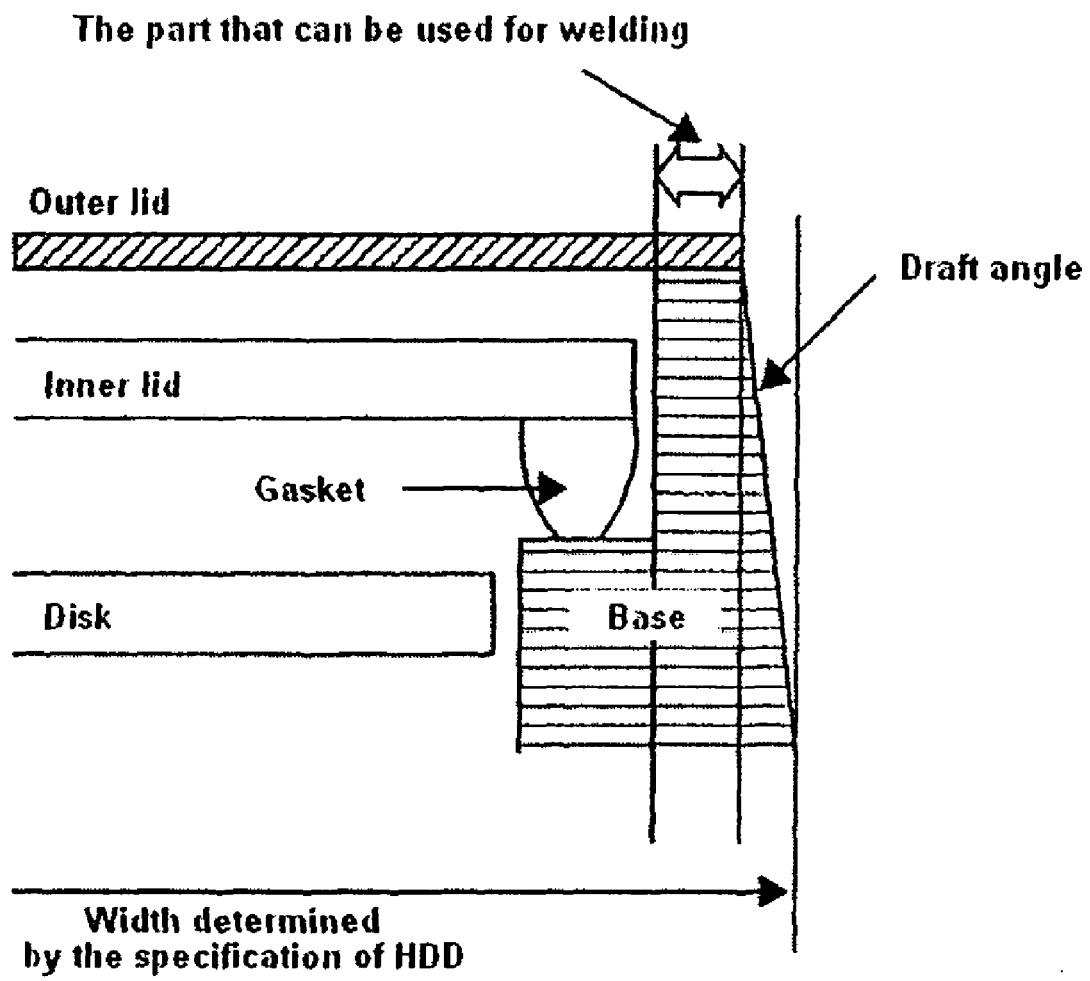
FIG. 7 is a schematic diagram showing the effect of draft angle on the base produced by die casting.
Figure 8:
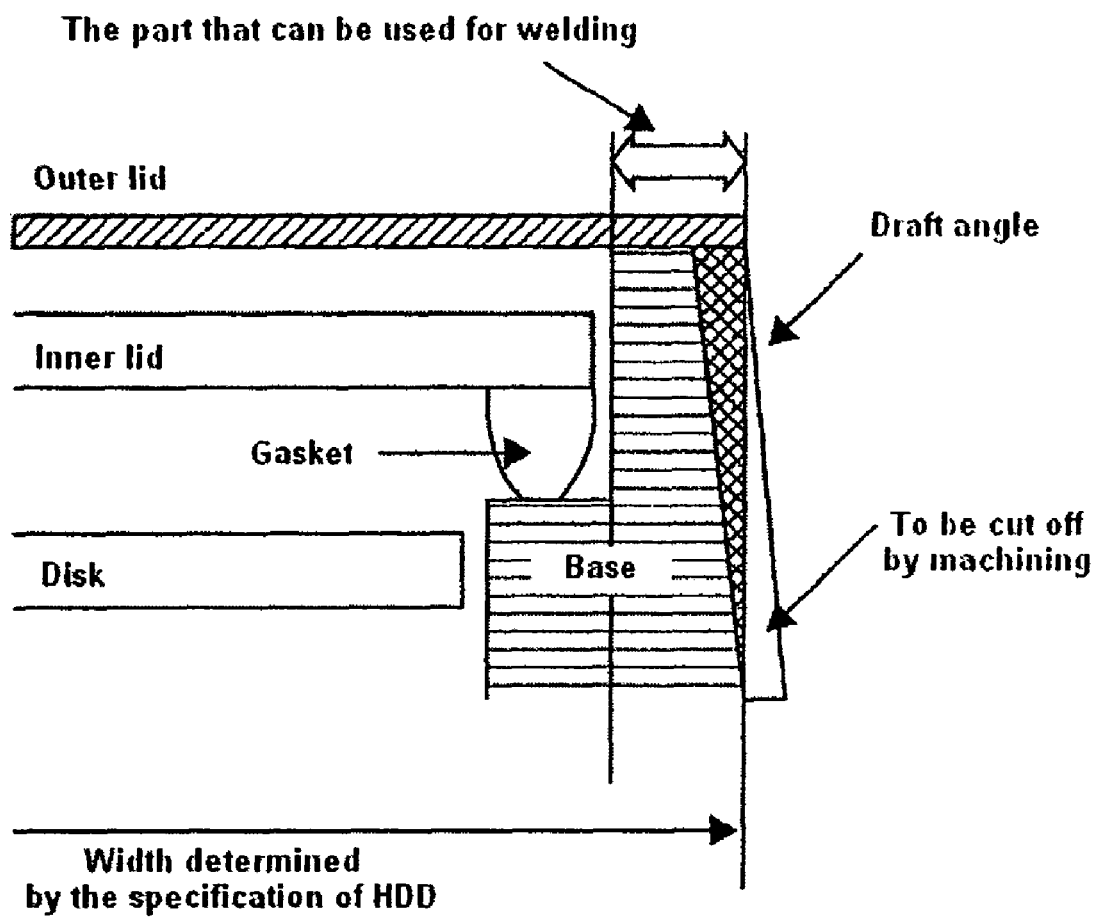
FIG. 8 is a schematic diagram showing the method of forming the base without being affected by draft angle.

Die casting to form the base 12 usually employs a draft angle to facilitate demolding. If the slope is to be within the dimension determined by the specification of HDD, as shown in FIG. 7, that part of the base 12 which comes into contact with the outer lid becomes narrower than necessary for laser welding. To cope with this difficulty, it is desirable to make a draft angle which makes the slope slightly larger than the dimension determined by the specification of HDD, as shown in FIG. 8. The expanding part of the slope is removed later by machining as mentioned above. In this way laser welding can be performed over the entire width of the rib of the base 12.

The wide rib offers the advantage of preventing the inside of the enclosure from being contaminated with molten metal resulting from laser welding. Such contamination occurs in the base made of aluminum by die casting. Die-cast aluminum contains hydrogen and other gases which suddenly expand due to laser's intense heat at the time of laser welding. Expanded gas blows off molten metal and leaves blow holes and other defects, which remain in the welded material. These problems are solved by performing laser welding at the outer periphery of the rib.

Figure 9:
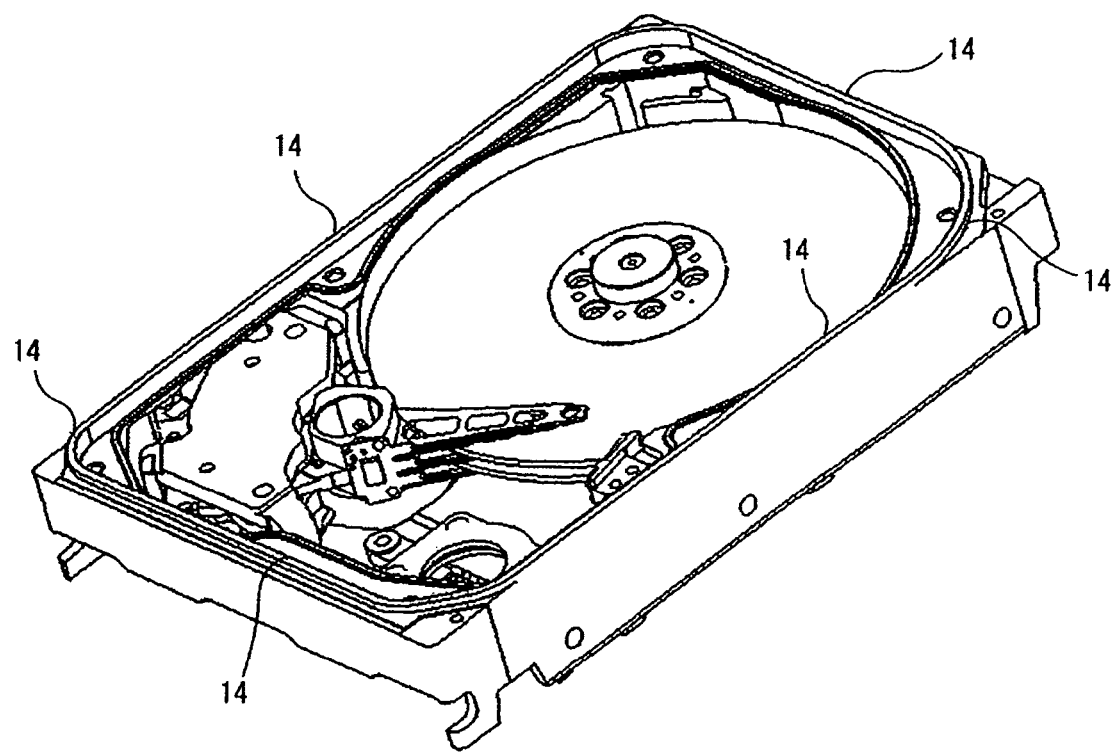
FIG. 9 is a perspective view showing a modified form of the magnetic disk drive.
Figure 10A:
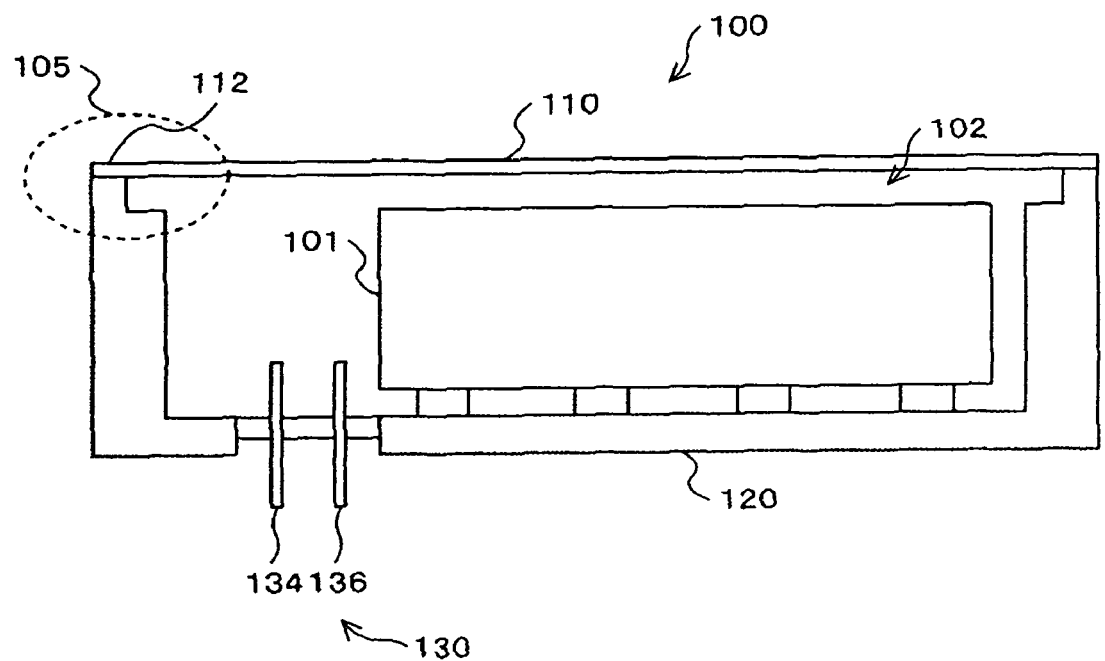
FIG. 10A is a schematic diagram showing the closed structure of the conventional magnetic disk drive.
Figure 10B:
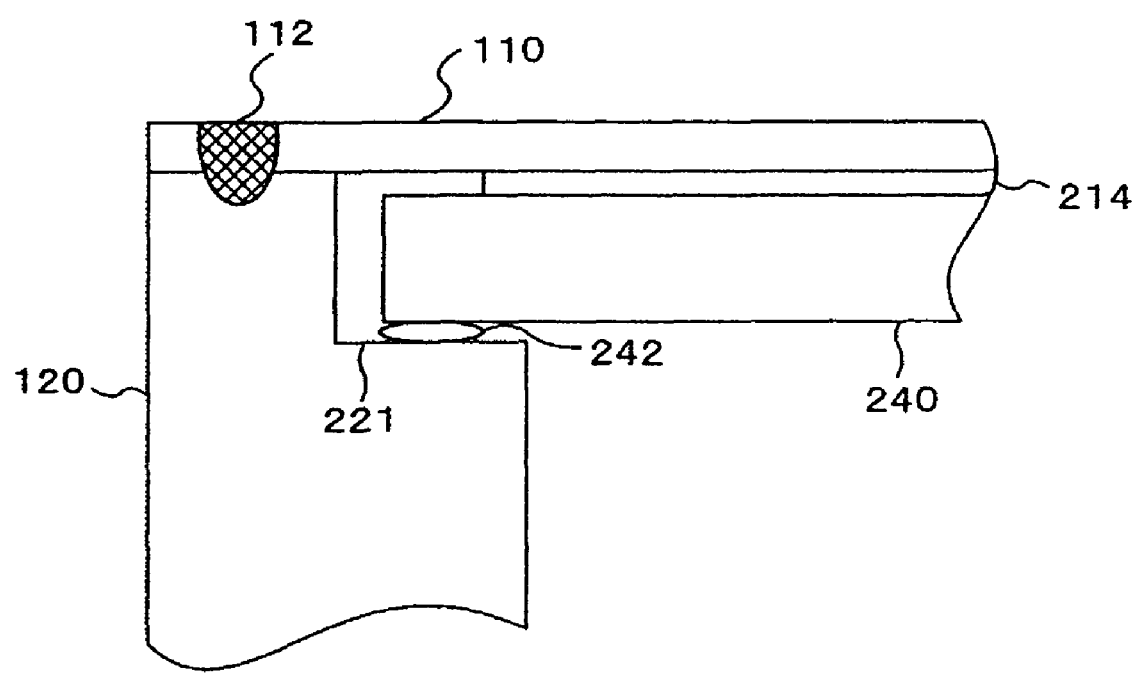
FIG. 10B is a schematic diagram showing the closed structure of the conventional magnetic disk drive.

The rib 14 should have a uniform thickness except for its corners, so that it has a minimum variation in heat capacity throughout the welding part. This leads to stable laser welding. Moreover, the rib 14 should desirably have a uniform thickness over its entire length (including corners) as shown in FIG. 9, so that it permits laser welding under uniform conditions throughout the entire periphery. This contributes to more stable laser welding.

As mentioned above, the embodiments of the present invention include the step of machining the joining part of the base to achieve a high dimensional accuracy necessary for laser welding. The result is that the edge of the lid conforms highly accurately to the base and there is a mini-mum of variation in the distance between the position of laser beam irradiation and the end surface of the base.

In addition, the step of machining in the example is performed on the lateral side of the base in consideration of the draft angle of the base. Machining in this manner maximizes the rib width and keeps the rib width constant with a high accuracy.

The foregoing procedure in the example makes uniform the heat capacity in the vicinity of the welding part, thereby permitting stable welding, and forms compact uniform beads at the welding parts of the base and the outer lid, thereby completely preventing helium leakage.

The step of machining in the example, which is per-formed on the lateral side of the base near the welding part, removes electrocoating from the machined part, there-by eliminating defective welding due to electrocoating.

The helium-filled enclosure that is obtained in the example permits rapid accurate positioning, power saving, and quiet operation. If power saving is not considered, it permits the disk to rotate faster or the head gimbal assembly to move faster, thereby improving the performance of the magnetic disk drive.

Moreover, the completely closed enclosure protects the HDA from variation of atmospheric pressure and humidity and also protects motor oil in the HDA from deterioration by oxidation.

What is claimed is:

1. A magnetic disk drive having a disk, a spindle motor to rotate said disk, a head to record and regenerate information on said disk, and an actuator assembly to move the head in the radial direction of said disk, which are placed in a hermetically sealed space filled with a low-density gas, said space being enclosed by an entirely electrocoated cast base having side walls and an outer lid joined to said side walls, wherein
the side walls of the base have their peripheral surface machined to remove the electrocoated surface and the casting surface and said first outer lid is joined to an upper surface of the side walls of the base by laser welding.

2. The magnetic disk drive as defined in claim 1, wherein an upper part of the side walls of the base is close to that part to which the outer lid is joined.

3. The magnetic disk drive as defined in claim 1, wherein the outer peripheral surface of the side walls of the base is the surface finished by machining over the entire surface.

4. The magnetic disk drive as defined in claim 1, wherein the side walls of the base have a uniform thickness except for the corners.

5. The magnetic disk drive as defined in claim 1, wherein the side walls of the base have a uniform thickness over an entire periphery.

6. The magnetic disk drive as defined in claim 1, wherein the outer lid has almost a same size as the outer shape of the side walls of the base.

7. The magnetic disk drive as defined in claim 1, wherein the low-density gas is helium.

8. The magnetic disk drive as defined in claim 1, wherein the side walls of the base have flanges on their inside, said flanges supporting an inner lid attached thereto.

9. A method for producing a magnetic disk drive, said method comprising:
preparing an entirely electrocoated cast base having internally flanged side walls,
incorporating said base with a disk and a head assembly composed of a spindle motor to rotate said disk, a head to record and regenerate information on said disk, and an actuator assembly to move said head in the radial direction of said disk,
attaching an inner lid to the flange of said base, with a seal inserted between them, thereby forming a closed enclosure,
performing machining on the upper peripheral surface of the side walls of said base, thereby removing the electrocoated surface and casting surface,
filling said closed enclosure with a low-density gas and inspecting the head disk assembly, and
arranging an outer lid on the top of the side walls of the base and then laser-welding said outer lid to the top of the side walls of the base.

10. The method for producing a magnetic disk drive as defined in claim 9, wherein the outer lid has almost the same size as an outer shape of the side walls of the base.

11. The method for producing a magnetic disk drive as defined in claim 9, wherein the performing machining on the upper peripheral surface of the side walls of said base, thereby removing the electrocoated surface and casting surface, is intended to machine the entire peripheral surface of the side walls of the base.

12. The method for producing a magnetic disk drive as defined in claim 9, wherein the base has a draft angle which expands outward more than a prescribed size and the step of performing machining on the upper peripheral surface of the side walls of said base, thereby removing the electrocoated surface and casting surface, is carried out in such a way as to remove the expanding part of draft angle.

* * * * *